United States Patent
Ukil et al.

(10) Patent No.: US 9,547,768 B2
(45) Date of Patent: Jan. 17, 2017

(54) PRIVACY MEASUREMENT AND QUANTIFICATION

(71) Applicant: Tata Consultancy Services Limited, Mumbai (IN)

(72) Inventors: Arijit Ukil, Kolkata (IN); Soma Bandyopadhyay, Kolkata (IN); Arpan Pal, Kolkata (IN)

(73) Assignee: Tata Consultancy Services Limited (IN)

( * ) Notice: Subject to any disclaimer, the term of this patent is extended or adjusted under 35 U.S.C. 154(b) by 28 days.

(21) Appl. No.: 14/627,185

(22) Filed: Feb. 20, 2015

(65) Prior Publication Data

US 2015/0261959 A1 Sep. 17, 2015

(30) Foreign Application Priority Data

Mar. 14, 2014 (IN) .......................... 870/MUM/2014

(51) Int. Cl.
*G06F 21/00* (2013.01)
*G06F 21/57* (2013.01)
(Continued)

(52) U.S. Cl.
CPC ......... *G06F 21/577* (2013.01); *G06F 11/3024* (2013.01); *G06F 11/3409* (2013.01); *G06F 21/6254* (2013.01); *G06F 2221/034* (2013.01)

(58) Field of Classification Search
None
See application file for complete search history.

(56) References Cited

U.S. PATENT DOCUMENTS 7,940,302 B2  5/2011  Mehrotra et al.
8,194,127 B2 *  6/2012  Kang ................... G06T 7/0026
                                                          348/143

(Continued)

FOREIGN PATENT DOCUMENTS

| CN | 102946307 A | 2/2013 |
| GB | 2493611 A | 2/2013 |
| KR | 20130067093 A | 6/2013 |

OTHER PUBLICATIONS

Wenbo He, Hoang Nguyen, Xue Liu, Klara Nahrstedt, Tarek Abdelzaher; "iPDA; An Integrity-Protecting Private Data Aggregation Scheme for Wireless Sensor Networks"; Department of Computer Science, University of Illinois at Urbana-Champaign, USA & School of Computer Science, McGill University, Canada, 2013.

(Continued)

*Primary Examiner* — Shin-Hon Chen
(74) *Attorney, Agent, or Firm* — Finnegan, Henderson, Farabow, Garrett, & Dunner, LLP

(57) ABSTRACT

System(s) and method(s) to provide privacy measurement and privacy quantification of sensor data are disclosed. The sensor data is received from a sensor. The private content associated with the sensor data is used to calculate a privacy measuring factor by using entropy based information theoretic model. A compensation value with respect to distribution dissimilarity is determined. The compensation value compensates a statistical deviation in the privacy measuring factor. The compensation value and the privacy measuring factor are used to determine a privacy quantification factor. The privacy quantification factor is scaled with respect to a predefined finite scale to obtain at least one scaled privacy quantification factor to provide quantification of privacy of the sensor data.

13 Claims, 8 Drawing Sheets

(51) Int. Cl.
*G06F 21/62* (2013.01)
*G06F 11/30* (2006.01)
*G06F 11/34* (2006.01)
G06F 11/00 (2006.01)
G06F 12/14 (2006.01)
G06F 12/16 (2006.01)
G08B 23/00 (2006.01)

(56) References Cited

U.S. PATENT DOCUMENTS

| | | | | |
|---|---|---|---|---|
| 8,543,711 | B2* | 9/2013 | Rolia | G06F 9/505 |
| | | | | 709/229 |
| 2007/0067853 | A1* | 3/2007 | Ramsey | G06F 21/316 |
| | | | | 726/28 |
| 2014/0157349 | A1* | 6/2014 | Robinson | G06K 9/00228 |
| | | | | 726/1 |
| 2014/0281572 | A1* | 9/2014 | Wang | G06F 21/6254 |
| | | | | 713/189 |
| 2014/0344941 | A1* | 11/2014 | Sibert | G06F 21/74 |
| | | | | 726/26 |
| 2015/0052601 | A1* | 2/2015 | White | H04L 63/1416 |
| | | | | 726/13 |
| 2015/0186635 | A1* | 7/2015 | Nakhjiri | H04L 63/00 |
| | | | | 726/17 |
| 2015/0208233 | A1* | 7/2015 | Rui | G06F 21/83 |
| | | | | 726/26 |
| 2015/0356317 | A1* | 12/2015 | Ukil | G06F 21/6245 |
| | | | | 726/28 |

OTHER PUBLICATIONS

Nalin Subramanian, Ka Yang, Wensheng Zhang and Daji Qiao; "ElliPS: A Privacy Preserving Scheme for Sensor Data Storage and Query"; Iowa State University, Ames, USAJ, Apr. 2009.

Jaydip Sen; "Secure and Privacy-Preserving Data Aggregation Protocols for Wireless Sensor Networks"; Innovation Lab, Tata Consultancy Servives Ltd., India Year 2012.

* cited by examiner

PRIVACY MEASUREMENT AND QUANTIFICATION

CROSS-REFERENCE TO RELATED PATENT APPLICATIONS

This U.S. patent application claims the benefit of priority under 35 U.S.C. §119 to India Patent Application No. 870/MUM/2014, filed on Mar. 14, 2014. The aforementioned application is incorporated herein by reference in its entirety.

TECHNICAL FIELD

The present disclosure in general relates to a method and system for privacy measurement of sensor data. More particularly, the system and method provides privacy measurement and privacy quantification of the time-series sensor data.

BACKGROUND

Information privacy or data privacy refers to a relationship between collection of data and dissemination of data. With respect to various issues such as legal and personal, privacy protection of sensor data has become an important requirement. Privacy concerns usually exist wherever personally identifiable information is collected and stored. Such personally identifiable information if not handled carefully may reveal personal data during analysis. The challenge while protecting personal data or sensitive data lies in amount of privacy that should be given as per the private content present in any personally identifiable information.

Existing privacy methodologies introduces different privacy preserving techniques to counter the problem of privacy breaching attacks. However, arbitrary privacy preservation on sensitive data would be over provisioning, considers worst-case scenario and thus minimizes the utility and intelligence of the privacy preserved sensor data. So it is equally important to measure amount of privacy content in a data set to be privacy protected before applying any privacy preserving technique. This will help in identifying required privacy and will also reduce data distortion.

One such methodology to provide data privacy includes encryption of sensor data. Although encryption of sensor data may protect the private content present in the sensor data, however the encryption may destroy complete utility of the sensor data particularly in broadcast or storage, only the person with key can understand the full content of sensor data, but others in the broadcast mode will get illegible data. One of the important issues associated with respect to known privacy preserving techniques is that, more the strength of privacy preservation on sensor data more utility or intelligence is lost, makes sensor data useless. Without measuring the amount of privacy protection required, arbitrary privacy preservation results in irreversible utility loss to sensor data.

SUMMARY OF THE INVENTION

This summary is provided to introduce aspects related to system(s) and method(s) for providing privacy measurement and privacy quantification of sensor data and the aspects are further described below in the detailed description. This summary is not intended to identify essential features of the claimed subject matter nor is it intended for use in determining or limiting the scope of the claimed subject matter.

The present disclosure relates to a method to provide privacy measurement and privacy quantification of sensor data. The method comprises receiving the sensor data from a sensor. The method further comprises calculating a privacy measuring factor with respect to a private content and a non private content associated with the sensor data. The privacy measuring factor is calculated by using a computation technique and the privacy measuring factor depicts an amount of privacy with respect to the private content. The method further comprises determining a compensation value with respect to the distribution dissimilarity of the private content such that the compensation value compensates a statistical deviation in the privacy measuring factor. The statistical deviation refers to a deviation in measurement of privacy while calculating the privacy measuring factor. The method further comprises determining a privacy quantification factor by using the compensation value and the privacy measuring factor and scaling the privacy quantification factor with respect to a predefined finite scale to obtain at least one scaled privacy quantification factor. The predefined scale comprises finite set of values and each value from the finite set of values refers to quantification of privacy content associated with the sensor data.

The present disclosure also provides a system to provide privacy measurement and privacy quantification of sensor data. The system comprises a processor and a memory coupled to the processor. The processor is capable of executing a plurality of modules stored in the memory. The plurality of modules comprises a receiving module configured to receive the sensor data from a sensor. The plurality of modules comprises a calculation module configured to calculate a privacy measuring factor with respect to a private content and a non private content associated with the sensor data. The privacy measuring factor is calculated by using a computation technique and the privacy measuring factor depicts an amount of privacy with respect to the private content. The plurality of modules comprises a determination module configured to determine a compensation value with respect to the distribution dissimilarity of private data; the compensation value compensates a statistical deviation in the privacy measuring factor. The statistical deviation refers to a deviation in measurement of privacy while calculating the privacy measuring factor. The determination module is further configured to determine a privacy quantification factor by using the compensation value and the privacy measuring factor. The plurality of modules comprises a privacy quantification module configured to scale the privacy quantification factor with respect to a predefined finite scale to obtain at least one scaled privacy quantification factor. The predefined finite scale comprises finite set of values and each value from the finite set of values refers to quantification of privacy content associated with the sensor data.

The present subject matter also provide computer program product having embodied thereon a computer program to provide privacy measurement and privacy quantification of sensor data. The computer program product comprises a program code for receiving the sensor data from a sensor. The computer program code further comprises a program code for calculating a privacy measuring factor with respect to a private content and a non private content associated with the sensor data. The privacy measuring factor is calculated by using a computation technique and the privacy measuring factor. The computer program code further comprises a program code for determining a compensation value with respect to the distribution dissimilarity of private content factor such that the compensation value compensates a statistical deviation in the privacy measuring factor. The statistical deviation refers to a deviation in measurement of privacy while calculating the privacy measuring factor. The computer program product further comprises a program code for determining a privacy quantification factor by using the compensation value and the privacy measuring factor and a program code for scaling the privacy quantification factor with respect to a predefined finite scale to obtain at least one scaled privacy quantification factor. The predefined scale comprises finite set of values and each value from the finite set of values refers to quantification of privacy content associated with the sensor data.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

While aspects of described system and method for providing privacy measurement and privacy quantification is shown may be implemented in any number of different computing systems, environments, and/or configurations, the embodiments are described in the context of the following exemplary system.

Figure 1:
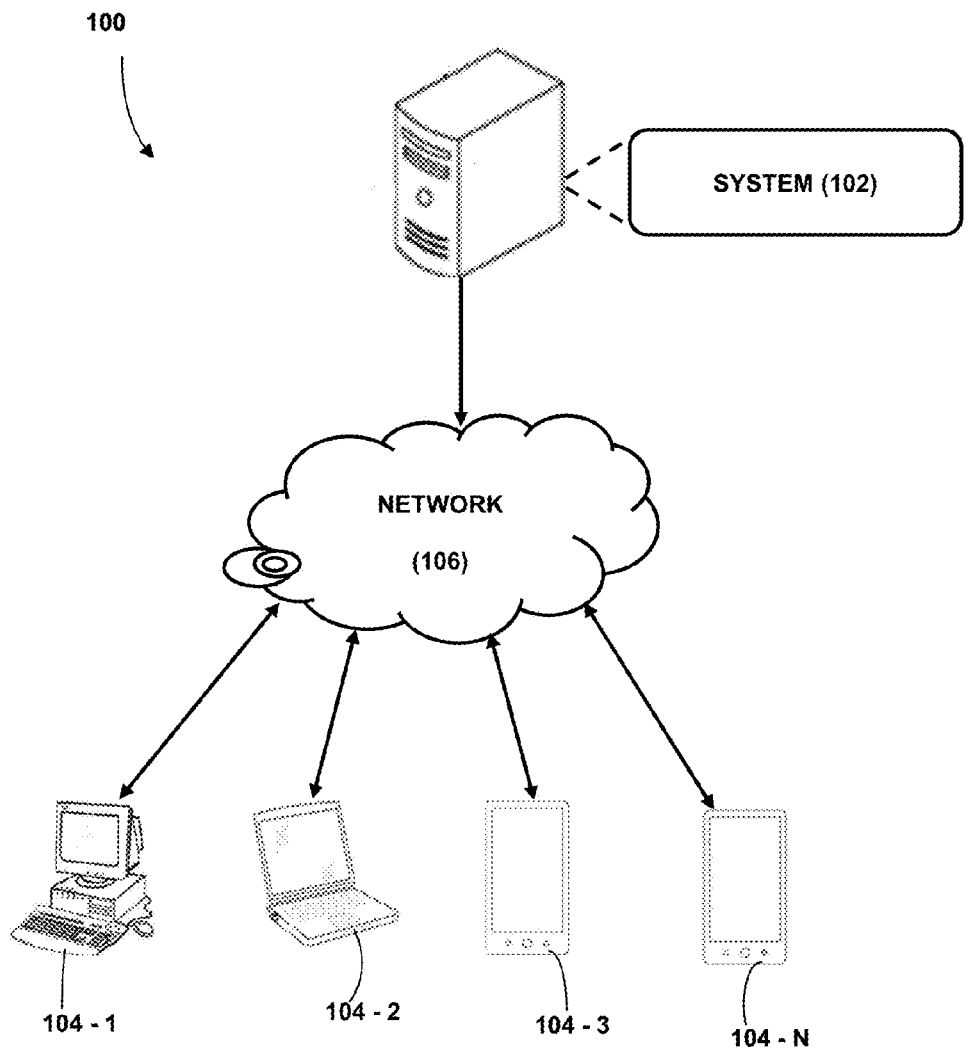
FIG. 1 illustrates a network implementation of a system for providing privacy measurement and privacy quantification is shown, in accordance with an embodiment of the present subject matter.

Referring now to FIG. 1, a network implementation 100 of system 102 for providing privacy measurement and privacy quantification of sensor data is shown. The data sensed by one or more sensor many a times comprise private data (or private content). The private content may reveal data about human activities. In order to protect the private data, many privacy techniques are applied over the sensor data. Before, applying the privacy techniques (such as adding noise), a privacy measurement factor is calculated for the sensor data. The privacy measurement factor depicts amount of privacy associated with the private data of the sensor data. The system 102 further determines a compensation value to remove deviation(s) or errors in the privacy measurement in terms of privacy measurement factor. The compensation value and the privacy measurement factor are used to calculate a privacy quantification factor. The privacy quantification factor is scaled with respect to a predefined finite scale in order to provide quantification of the private data of the sensor data in terms of scaled privacy quantification factor.

Although the present subject matter is explained considering that the system 102 is implemented as an application on a server, it may be understood that the system 102 may also be implemented in a variety of computing systems, such as a laptop computer, a desktop computer, a notebook, a workstation, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
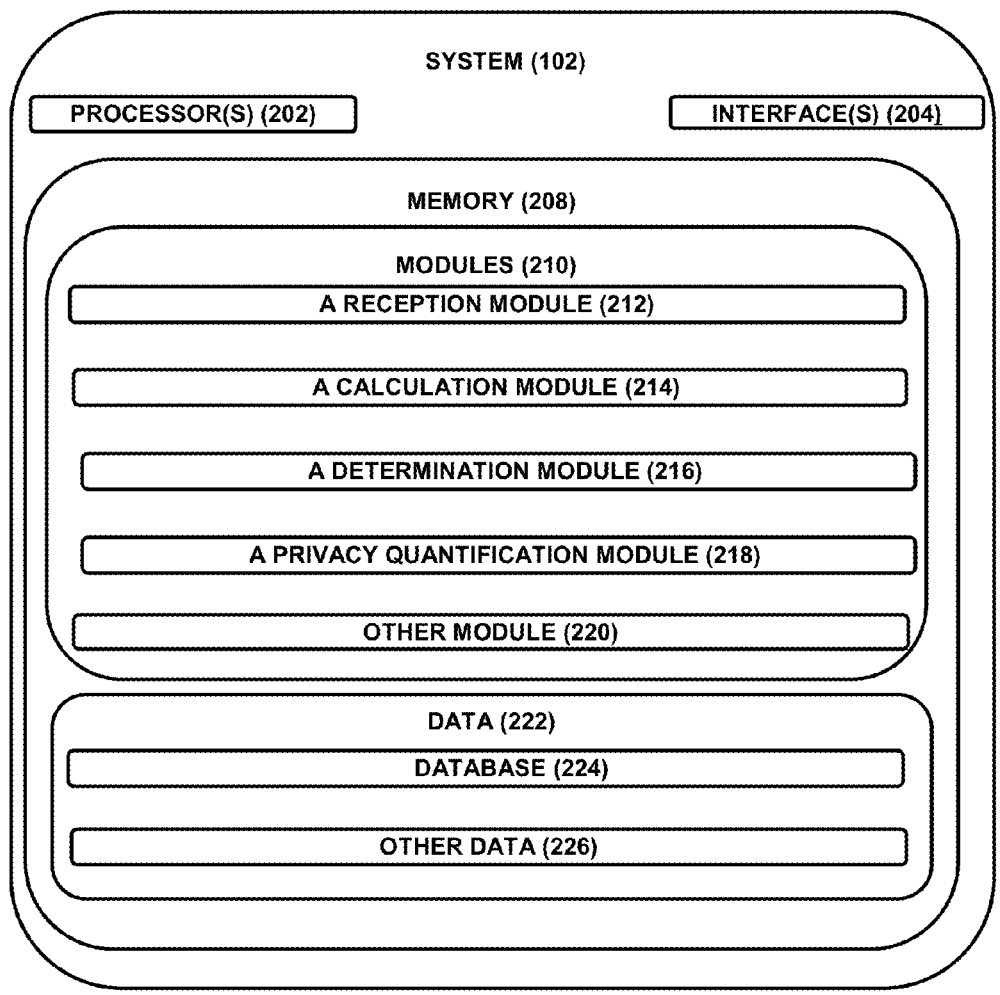
FIG. 2 illustrates the system for providing privacy measurement and privacy quantification is shown, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 220.

The modules 210 include routines, programs, objects, components, data structures, etc., which perform particular tasks, functions or implement particular abstract data types. In one implementation, the modules 210 may include a receiving module 212, a calculation module 214, and a determination module 216 and a privacy quantification module 218. Other modules 220 may include programs or coded instructions that supplement applications and functions of the system 102.

The data 222, amongst other things, serves as a repository for storing data processed, received, and generated by one or more of the modules 218. The data 222 may also include a database 224, and other data 226. The other data 226 may include data generated as a result of the execution of one or more modules in the other module 220.

The present disclosure relates to system(s) and method(s) for privacy measurement and privacy quantification of sensor data. The privacy is quantified in terms of a privacy quantification factor. The privacy is quantified in a predefined range. The privacy is quantified by scaling the privacy quantification factor with respect to a predefined finite scale. The finite values in the predefined finite scale refer to the predefined range and contain values from low to high. The value from low to high provides the privacy quantification.

The receiving module 212 is configured to receive sensor data from a sensor. The sensor data comprises time series data. The time series data further comprises smart meter data, temperature data or other sensor data. The sensor data further comprises private data and non private data.

By way of a non limiting example, data sensed by a smart energy management system (sensor) is considered. Fine grained smart meter data is used by utility and other third party applications such as theft detection, smart grid management, push retail marketing, dynamic energy pricing or a combination thereof. The smart meter potential data has potential of revealing minute details of human activity and that may be privacy breaching. The minute detail of human activity is considered as private data.

The system 102 provides measurement and quantification of the private content of the sensor data before applying any privacy technique (such as adding noise, encryption). As the sensor collects physical sensor data about human activities, some of the sensor data signifies private events. The private events refer to events that are unpredictable and individual-centric. For example, details revealing identity of an individual.

The calculation module 214 is configured to calculate a privacy measuring factor by using the private content and the non private content associated with the sensor data. The privacy measuring factor is calculated by using an entropy computation (or entropy based information theoretic model). The privacy measuring factor depicts an amount of privacy with respect to private events associated with the private content.

The calculation module 214 uses an information theoretical (computation technique) model for calculating the privacy measuring factor.

S is considered the sensor data under investigation and $\rho$ is considered as private content or sensitive part of S. $\delta$ is considered as non private content or non sensitive content of S.

So, $S = \rho \cup \delta$

The privacy measuring factor of sensor data S is represented by $P_i$ $$P_i = \frac{\sum_{i=1}^{|\rho|} \rho_i \cdot \log_2 \frac{1}{\rho}}{\sum_{i=1}^{|S|} S_i \cdot \log_2 \frac{1}{S_i}}, \quad (1)$$

where $|S| > 1$, $|\rho| > 1$
where $|\rho|$ denotes number of discrete data points in $\rho$ and $|S|$ denotes number of discrete data points in S.

The determination module 216 is configured to determine a compensation value with respect to distribution dissimilarity in the private content of the sensor data in order to provide an accurate measurement of privacy in terms of privacy measurement factor. The determination module 218 is determined to compensate a statistical deviation in the privacy measuring factor. The statistical deviation refers to a deviation in measurement of privacy while the privacy measuring factor is being calculated. As the private content (private events) are subset of overall sensor data, private events have (mostly) similar distribution characteristics like the sensor data set, that incurs error in the measurement of the privacy in terms of the privacy measuring factor, as they are not independent. So, statistical compensation value (or compensation value) is used to remove the error.

The statistical deviation refers to an error due to statistical relationship between S and $\rho$. In order to determine the statistical deviation (or error) a two sample Kolmogorov-Smirnov (KS) test of S and $\rho$ is performed. The Kolmogorov-Smirnov test is a nonparametric hypothesis test that evaluates the difference between the cumulative distribution functions of the distributions of S and $\rho$. The Kolmogorov-Smirnov test computes under the null hypothesis that S and $\rho$ are drawn from the same distribution or not. When KS-test accepts null hypotheses, statistical compensation $P_s$ is 1. Otherwise, Wasserstein distance wd between S and $\rho$ is computed, which quantifies the numerical cost with respect to distribution dissimilarity between pair of distributions of S and $\rho$ as $\rho$ is derived from S and statistical compensation $P_s$ equals to wd, where:

Wasserstein distance quantifies the numerical cost with respect to distribution dissimilarity between pair of distributions, defined for $\delta \cdot \rho$:

$$w_\delta := \inf_{\mu \in \Omega(\delta,\rho)} \int_\Omega |x-y| d\mu(x,y), \; x \in \delta, \; y \in \rho$$

As $w_\delta$ is not straightforward for implementation, system 102 chooses closed solution considering CDFs of $\delta, \rho$ as: $w_\delta = \int_0^1 |\mathcal{F}^{-1}(\mathcal{Q}) - \mathcal{Q}^{-1}(\mathcal{Q})| d\mathcal{Q}$, where $\mathcal{F}$, $\mathcal{Q}$ be the distribution functions of $\delta, \rho$.

In order to ensure over the privacy of the sensor data while measuring the privacy measuring factor, both information theoretic and statistical property should be satisfied. The determination module 216 is further configured to determine a privacy quantification factor by using the privacy measurement factor and the compensation value.

Logically, Privacy quantification factor=information theoretic model ($\Lambda$) statistical compensation.

Algebraically, Privacy quantification factor=information theoretic model (privacy measurement factor)×compensation value Therefore, $Pq=P_i \times P_s$, $Pq<1$.

The privacy quantification module 218 is configured to scale the privacy quantification factor (Pq) with respect to a predefined finite scale to obtain at least one scaled privacy quantification factor (Pq scaled). The predefined finite scale comprises finite set of values ranging from 1 to 5. Each value of the predefined finite scale refers to a quantification of private content thereby providing privacy quantification of the sensor data. Value 1 in the predefined finite scale means least amount or no private events in the sensor data set and value 5 in the redefined finite scale means highest private event in the sensor data. Privacy quantification may be maximum to value 1, which is equated to 5 and minimum value is equated to 1.

The system 102 further applies a privacy technique based on the scaled quantification factor. Based on Pq scaled, sensor data S is converted into S' by introducing privacy preservation strength proportional (directly proportional) or equivalent to Pq scaled. For example, when additive noise N is to be added to S to generate S', i.e.

S'=S+N, where N is function of Pq scaled. More the value of Pq scaled, more noise to be added. Generally, more the magnitude of scaled privacy quantification factor, more noise, distortion, obfuscation, perturbation, generalization or suppression is added.

Figure 5:
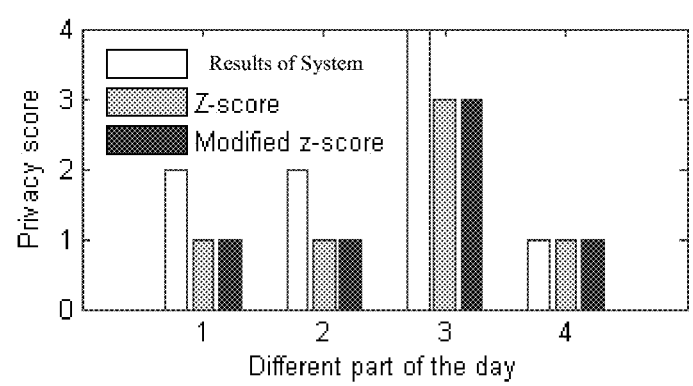
FIG. 5 illustrates comparative results of privacy quantification in accordance with an exemplary embodiment of the present subject matter.
Figure 6:
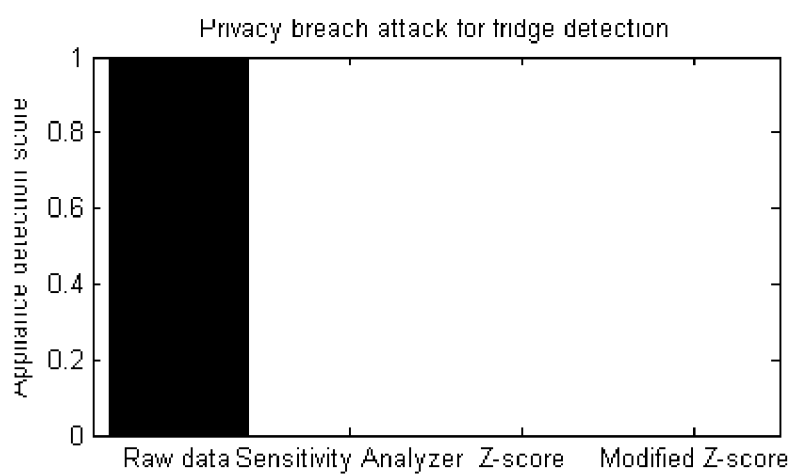
FIG. 6 illustrates results with respect to privacy breach attack for fridge detection in accordance with an exemplary embodiment of the present subject matter.
Figure 7:
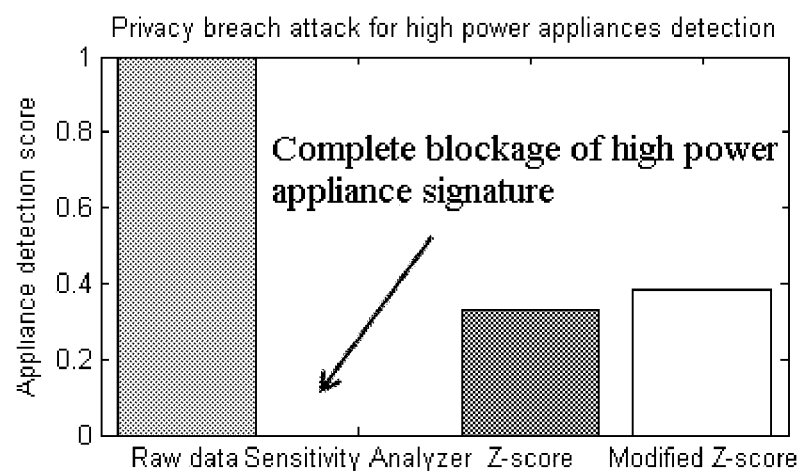
FIG. 7 illustrates results with respect to privacy breach attack for high power appliances detection in accordance with an exemplary embodiment of the present subject matter.
Figure 8:
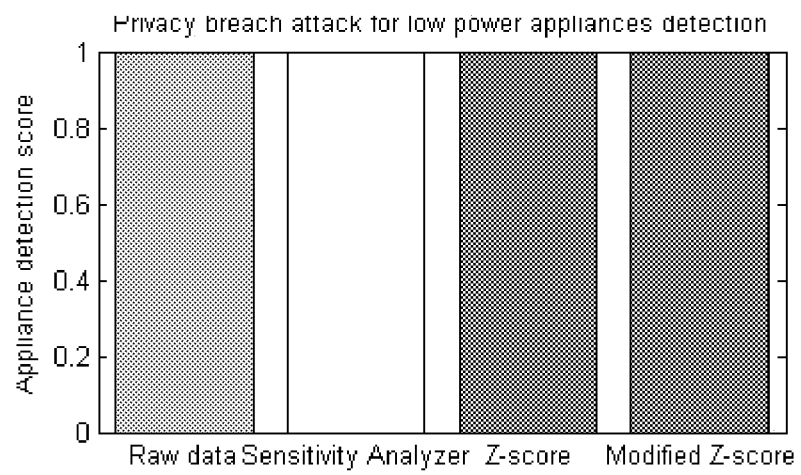
FIG. 8 illustrates privacy breach for low power appliances detection in accordance with an exemplary embodiment of the present subject matter.

By way of a non limiting exemplary embodiment, FIG. 5 provides an outcome of privacy quantification by using system 102 comparing with few other solutions (1-2) using REDD dataset (Raw sensor data) [3, a known method] for 24 hour smart meter dataset, where four groups of 6 hour is considered for measurement. The system 102 provides privacy measure for each of the four equal parts of the day. Further efficacy of the privacy measure of system 102 is established by measuring the privacy risk probability when an attack with standard disaggregation or NILM (Non-Intrusive Load Monitoring) is launched, this is shown in FIG. 6-8, which shows that proposed system 102 and method successfully defends leaking of fridge and high power appliance signature.

Figure 3:
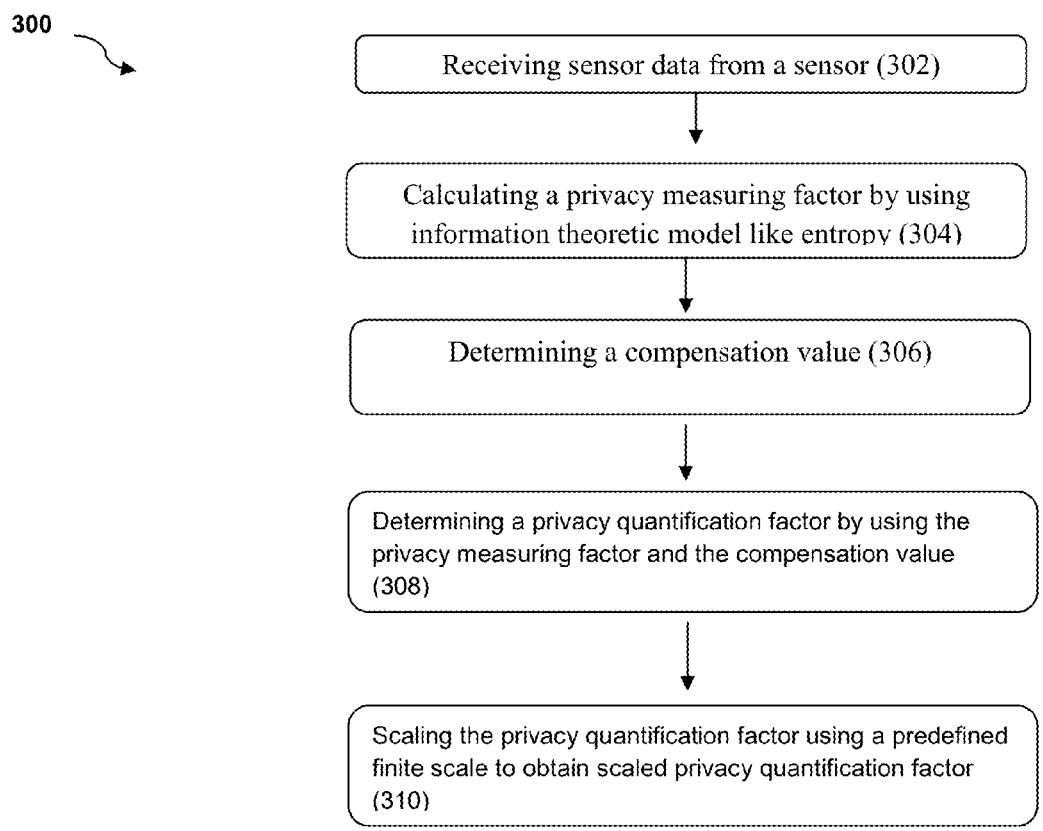
FIG. 3 illustrates a method for providing privacy measurement and privacy quantification is shown, in accordance with an embodiment of the present subject matter.

Referring to FIG. 3, the order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, sensor data from one or more sensors is received.

At block 304, a privacy measuring factor is calculated by using the private content. The privacy measuring factor depicts an amount of privacy with respect to the private events associated with the private content.

At block 306, a compensation value with respect to the privacy measuring factor is determined.

At block 308, a privacy quantification factor is determined by using the privacy measuring factor and the compensation value.

At block 310, the privacy quantification factor is scaled with respect to a predefined finite scale to obtain at least one scaled privacy quantification factor.

Figure 4:
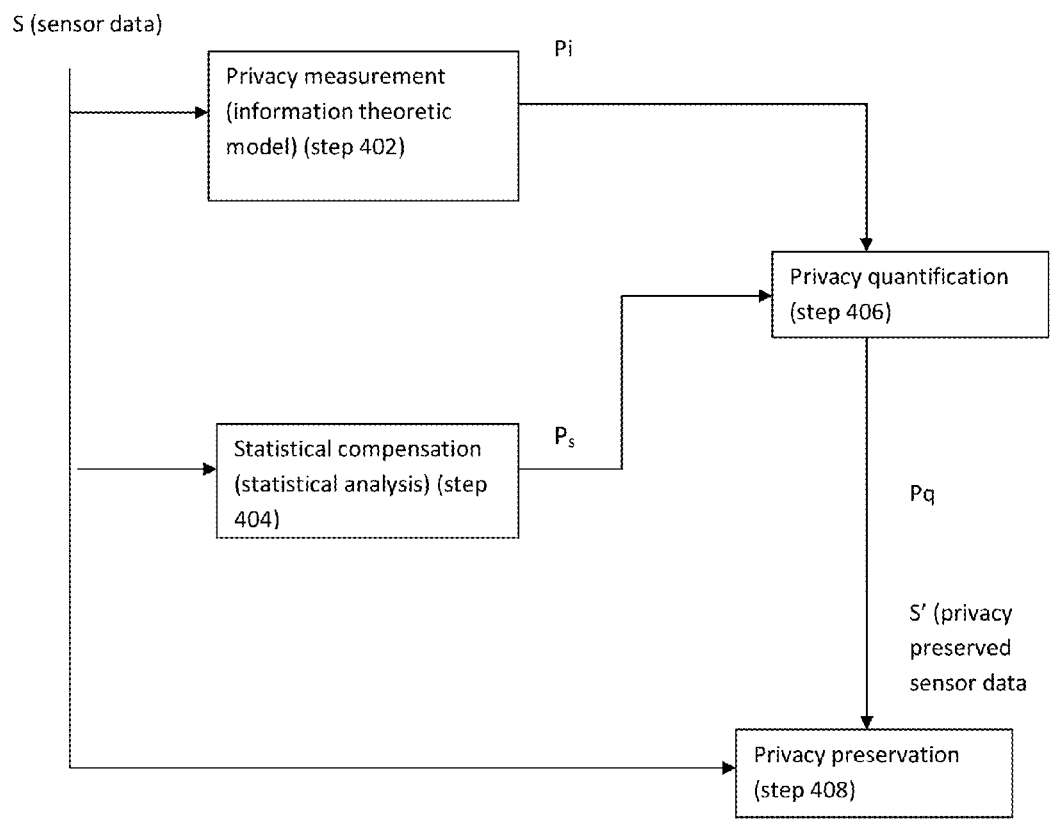
FIG. 4 illustrates a flow chart for privacy measurement and privacy quantification in accordance with an exemplary embodiment of the present subject matter.

Referring to FIG. 4, the method for privacy measurement and quantification comprises calculation or computation of privacy measurement factor by using equation 1 (step 402 and 404). Kolmogorov-Smirnov (KS) test is conducted two sample test between S and ρ. If KS-tests results in 0, privacy quantification factor=privacy measurement value*5. Else, find Wasserstein distance wd and privacy quantification factor=privacy measurement value*wd*5. Thus a privacy quantification factor is determined (step 406).

Privacy preservation on sensor data is function of privacy quantification factor. More the magnitude of privacy quantification factor, more noise, distortion, obfuscation, perturbation, generalization or suppression is added (step 408).

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

What is claimed is:

1. A method to provide privacy measurement and privacy quantification of sensor data, the method comprising:
   receiving sensor data from a sensor;
   calculating a privacy measuring factor with respect to a private content and a non-private content, wherein the private content and the non-private content are associated with the sensor data, wherein the privacy measuring factor is calculated by using a computation technique, wherein the computation technique comprises an entropy based information theoretical model along with computational robustness enhancer through statistical compensation that is computed using Wasserstein distance when two-sample Kolmogorov-Smirnov test finds a misfit between the distribution of private data and the input sensor data and wherein the privacy measuring factor depicts an amount of privacy with respect to the private content;
   determining a compensation value with respect to a distribution dissimilarity of private content such that the compensation value compensates a statistical deviation in the privacy measuring factor, wherein the statistical deviation refers to a deviation in measurement of privacy while calculating the privacy measuring factor;
   determining a privacy quantification factor by using the compensation value and the privacy measuring factor; and
   scaling the privacy quantification factor with respect to a predefined finite scale to obtain at least one scaled privacy quantification factor, wherein the predefined scale comprises a finite set of values, and wherein each value from the finite set of values refers to quantification of privacy content associated with the sensor data; wherein the receiving, the identifying, the calculating, the determining the compensation value, the determining the privacy quantification factor and the scaling are performed by a processor.

2. The method of claim 1, wherein the sensor data comprises time series data, and wherein the time series data comprises smart meter data, temperature data, or other sensor data.

3. The method of claim 1, wherein the statistical compensation value compensates an error in the privacy measuring factor, wherein the error is due to a statistical relation between private data and sensor data, wherein the private data and the sensor data are drawn from a similar distribution.

4. The method of claim 1, wherein the privacy quantification factor is determined by using a product of the compensation value and the privacy measuring factor.

5. The method of claim 1, further comprising preserving the sensor data based on the scaled privacy quantification factor by using at least one privacy preservation technique, wherein the at least one privacy preservation technique comprising adding noise to the sensor data, wherein the noise is added equivalent to a privacy quantification value; and wherein the noise to be added is directly proportional to the privacy quantification factor.

6. A system to provide privacy measurement and privacy quantification of sensor data, the system comprising:
a hardware processor; and
a memory coupled to the processor, wherein the processor is capable of executing a plurality of modules stored in the memory, and wherein the plurality of modules comprising:
a receiving module configured to receive sensor data from a sensor;
a calculation module configured to calculate a privacy measuring factor with respect to a private content and a non-private content, wherein the private content and the non-private content are associated with the sensor data, wherein the privacy measuring factor is calculated by using a computation technique, wherein the computation technique comprises an entropy based information theoretical model along with computational robustness enhancer through statistical compensation that is computed using Wasserstein distance when two-sample Kolmogorov-Smirnov test finds a misfit between the distribution of private data and the input sensor data and wherein the privacy measuring factor depicts an amount of privacy with respect to the private content;
a determination module configured to:
determine a compensation value with respect to a distribution dissimilarity of private content such that the compensation value compensates a statistical deviation in the privacy measuring factor, wherein the statistical deviation refers to a deviation in measurement of privacy while calculating the privacy measuring factor;
determine a privacy quantification factor by using the compensation value and the privacy measuring factor; and
a privacy quantification module configured to scale the privacy quantification factor with respect to a predefined finite scale to obtain at least one scaled privacy quantification factor, wherein the predefined finite scale comprises a finite set of values, and wherein each value from the finite set of values refers to quantification of privacy content associated with the sensor data.

7. The system of claim 6, further comprising preserving the sensor data based on the scaled privacy quantification factor by using at least one privacy preservation technique, wherein the at least one privacy preservation technique comprising adding noise to the sensor data.

8. The system of claim 6, wherein the sensor data comprises time series data, and wherein the time series data comprises smart meter data, temperature data, or other sensor data.

9. The system of claim 6, wherein the statistical compensation value compensates an error in the privacy measuring factor, wherein the error is due to a statistical relation between private data and sensor data, wherein the private data and the sensor data are drawn from a similar distribution.

10. The system of claim 6, wherein the privacy quantification factor is determined by using a product of the compensation value and the privacy measuring factor.

11. A non-transitory computer readable storage medium having embodied thereon a computer program, when executed by a computing device, to provide privacy measurement and privacy quantification of sensor data, the computer readable storage medium comprising:
a program code for receiving sensor data from at least one sensor;
a program code for calculating a privacy measuring factor with respect to a private content and a non-private content, wherein the private content and the non-private content are associated with the sensor data, wherein the privacy measuring factor is calculated by using an entropy computation technique along with computational robustness enhancement through statistical compensation that is computed using Wasserstein distance when two-sample Kolmogorov-Smirnov test finds a misfit between the distribution of private data and the input sensor data, and wherein the privacy measuring factor depicts an amount of privacy with respect to the private content;
a program code for determining a compensation value with respect to a distribution dissimilarity of private content such that the compensation value compensates a statistical deviation in the privacy measuring factor, wherein the statistical deviation refers to a deviation in measurement of privacy while calculating the privacy measuring factor;
a program code for determining a privacy quantification factor by using the compensation value and the privacy measuring factor; and
a program code for scaling the privacy quantification factor with respect to a predefined finite scale to obtain at least one scaled privacy quantification factor, wherein the predefined scale comprises finite set of values, and wherein each value from the finite set of values refers to quantification of privacy content associated with the sensor data.

12. The computer program product of claim 11, further comprising a program code for preserving the sensor data based on the scaled privacy quantification factor by using at least one privacy preservation technique, wherein the at least one privacy preservation technique comprising adding noise to the sensor data.

13. The computer program product of claim 11, wherein the statistical compensation value compensates an error in the privacy measuring factor, wherein the error is due to a statistical relation between private data and sensor data, wherein the private data and the sensor data are drawn from a similar distribution.

* * * * *